United States Patent [19]

Meyerle et al.

[11] 4,304,151

[45] Dec. 8, 1981

[54] STEPLESS COMPOSITE HYDROSTATIC-MECHANICAL TRANSMISSION

[75] Inventors: Michael Meyerle, Meckenbeuren; Anton Ott, Tettnang; Friedrich Ehrlinger, Friedrichshafen-Berg, all of Fed. Rep. of Germany

[73] Assignee: Zahnradfabrik Friedrichshafen AG, Friedrichshafen, Fed. Rep. of Germany

[21] Appl. No.: 971,566

[22] Filed: Dec. 20, 1978

[30] Foreign Application Priority Data

Dec. 22, 1977 [DE] Fed. Rep. of Germany ....... 2757191

[51] Int. Cl.³ ............................................. F16H 47/04
[52] U.S. Cl. ......................................... 74/687; 74/674
[58] Field of Search ........................................ 74/687

[56] References Cited

U.S. PATENT DOCUMENTS

| | | | |
|---|---|---|---|
| 3,433,095 | 3/1969 | Tuck | 74/687 |
| 3,580,107 | 5/1971 | Orshansky | 74/687 |
| 3,626,787 | 12/1971 | Singer | 74/687 |
| 3,733,931 | 5/1973 | Nyman et al. | 74/687 |
| 3,786,696 | 1/1974 | Aleem | 74/687 |
| 3,855,879 | 12/1974 | DeLalio | 74/687 |
| 3,884,095 | 5/1975 | Miyao et al. | 74/687 |
| 3,979,972 | 9/1976 | Sakai et al. | 74/687 |

FOREIGN PATENT DOCUMENTS

| | | |
|---|---|---|
| 976055 | 1/1963 | Fed. Rep. of Germany . |
| 1775755 | 9/1971 | Fed. Rep. of Germany . |
| 2415002 | 3/1976 | Fed. Rep. of Germany ........ 74/687 |
| 1265223 | 3/1972 | United Kingdom . |
| 1318943 | 5/1973 | United Kingdom . |
| 1364962 | 8/1974 | United Kingdom . |
| 1460817 | 1/1977 | United Kingdom . |

OTHER PUBLICATIONS

Uberlagerungsantriebe, Jean Thoma, pp. 123–126, 4/1971.

*Primary Examiner*—Leslie Braun
*Attorney, Agent, or Firm*—Karl F. Ross

[57] ABSTRACT

A composite transmission with power branching between a hydrostatic transmission and a mechanical summing transmission in which the hydrostatic transmission has a variable displacement unit. The input shaft is connected to the variable displacement unit and to a ring gear on the four-shaft summing transmission of which the ring gear and sun gear are selectively connectible by respective clutches to the constant displacement hydraulic unit. The planet carrier of the summing transmission is connected to the output shaft. The output shaft can also be directly coupled to the input shaft by a clutch and a further planetary can be provided between the fourth shaft of the summing transmission and the output shaft.

14 Claims, 3 Drawing Figures

STEPLESS COMPOSITE HYDROSTATIC-MECHANICAL TRANSMISSION

FIELD OF THE INVENTION

The invention relates to a stepless hydrostatic-mechanical composite transmission in which the hydraulic and mechanical power branches are combined in a multi-shaft planetary-gear transmission forming a summing transmission.

BACKGROUND OF THE INVENTION

A hydrostatic-mechanical composite transmission is described, for example, in German Pat. No. 2 415 002. In this system, the mechanical transmission branch is formed as a gear-change transmission so that during direction change, all of the parts connected to the input shaft of the mechanical transmission, which has only a single output shaft, must be reversed in direction and the rotating masses of these parts must likewise change in rotational sense. In addition, a compensation of the throughput of the two hydrostatic units is required so that the hydrostatic system must be switched from a completely negative to a completely positive range. The terms "positive" and "negative" are here used to represent fluid displacement in opposite directions, i.e. reversal of the output port of the pump and the input port thereof so that the formerly output port becomes the input port and the previous input port becomes the output port.

A positive clutch is required in this system which can only come into play when both of the range-selecting clutches are open. For a reversible vehicle, such a transmission is not successful. The use of such a transmission results in high wear of the moving parts because of the operational limitations discussed above.

OBJECTS OF THE INVENTION

It is the object of the present invention to provide a steplessly adjustable hydrostatic-mechanical composite transmission which avoids the aforedescribed disadvantages and thus can provide for wear-free reversal, e.g. from forward drive to reverse, which has an optimum power/weight and power/volume ratio, and in spite of the latter has a minimum hydraulic loading.

Another object of the invention is to provide an improved stepless hydrostatic-mechanical composite transmission with greater useful life than earlier systems.

It is also an object of the invention to provide a steplessly adjustable hydrostatic-mechanical composite transmission which has a relatively low break-loose resistance, i.e. intrinsic starting resistance, than earlier transmissions of the composite type using a hydrostatic motor which must be brought into operation from standstill.

Still another object of the invention is to provide a composite transmission using mechanical and hydraulic power branching which has a high starting torque and improved driving qualities.

SUMMARY OF THE INVENTION

These objects and others which will become apparent hereinafter are attained, in accordance with the present invention, in a hydrostatic-mechanical composite transmission in which the input shaft of the composite transmission is connected with a first hydrostatic unit and with a first shaft of a four-shaft summing transmission each directly or via the intermediary of other members which are in constant rotation when the input shaft is driven. The second hydrostatic unit is connected via selectively switchable or collectively switchable clutches with a second or third shaft or both of them of the summing transmission. The fourth shaft of the summing transmission is connected directly or through intermediate members to the hydraulic or mechanical power branches.

Advantageously, the composite transmission, which can be used for vehicles having relatively low reverse speed, and can be constructed so that in the first shifting or speed range, the following relationships prevail:

(a) with maximum negative limiting position of the composite transmission or at maximum possible negative output speed for reverse drive, the hydrostatic transmission is set to maximum negative position; and (b) in the neutral position of the composite transmission, the hydrostatic transmission is set to a lesser negative value between the maximum setting and its neutral setting, for example 0.6 times the maximum negative setting of the hydrostatic unit.

Advantageously, and if desired to obtain a high reverse speed, the summing transmission can feed into a speed-changing transmission with selectable gear sets or a planetary-gear transmission. The reversing transmission can be of the type in which the gear sets are selected by clutches or brakes or a planetary-gear transmission one of whose members may be braked or coupled to another member. For the direct connection of the input shaft of the composite transmission with its output shaft, the two can be connected via one or more gear sets, e.g. through a multispeed transmission in which respective gear sets are selected by clutches for brakes, or a planetary gear transmission can be provided for this purpose. Alternatively, a shifting clutch may connect the input shaft directly to such a transmission or to the output shaft and the summing transmission can form part of this direct drive system as well.

When vehicles with high reverse speeds are to be provided, the planetary-gear transmission can be provided as a reversing transmission with two selectively operable members.

To bring the hydrostatic transmission or unit into a loadfree state, it is also advantageous to provide in the hydraulic circuit of the hydrostatic transmission means for compensating for the speed of the composite transmission. In the neutral setting of the system or upon direct connection of the output shaft of the composite transmission with the input shaft, therefore, a shunt valve is provided to bridge the input and output sides of the hydrostatic pump. Alternatively or in addition, the second hydrostatic unit, i.e. the hydrostatic motor, can be separated from the summing transmission via the two shifting clutches.

It has been found to be advantageous to provide means for operating the two clutches associated with the hydraulic power branch concurrently. In this manner, the hydraulic power branch can be cut out because when the clutches are closed, the members of the summing transmission have no negative rotation and thus run as a unit.

The steplessly adjustable hydrostatic-mechanical composite transmission of the present invention is not only of simple construction and hence economical to fabricate, but has been found to be advantageous with respect to its operating parameters and its use. When, for example, the input shaft of the composite transmission is connected with the first hydrostatic unit and with a first shaft of the summing transmission, the second hydrostatic unit is connected via clutches with a second and/or third shaft of the summing transmission and the fourth shaft of the latter is coupled to the outward shaft of the composite transmission, the following additional advantages are gained:

(a) Stepless speed control is provided over at least two forward speed ranges as well as a reverse speed range which can represent reversal in the first speed range corresponding to the forward drives.

(b) If a reversing transmission is provided downstream of the summing transmission, the same forward and reverse speed ranges are provided. This transmission is preferably a four-speed planetary transmission or a gear transmission having respective sets of gears which can be switched into operation by respective clutches or brakes.

(c) In each speed range, hydraulic-mechanical power transmissions occur and with minimum hydraulic power, i.e. hydraulic power on the average below 25%, especially efficient operation is obtained.

(d) The system has an excellent hydrostatic efficiency allowing a relatively small hydrostatic unit to be used and hence reduced power/weight and power/volume ratios.

(e) The stress and wear of the hydrostatic unit is minimized.

(f) The nominal hydraulic power or apparent hydraulic power of the system can be minimized.

(g) The shifting qualities of the transmission are good since a continuous traction and efficiency are maintained during speed shifting.

(h) The power which can be handled by the transmission is significantly greater than the hydraulic power.

(i) The well-known disadvantages of the break-loose torque (startup torque) of the hydrostatic motor are obviated since both hydrostatic units are rotating at startup of the vehicle and this increases the tractive force available for startup acceleration of the vehicle.

(j) Only a single hydrostatic unit need be controlled, not both.

(k) The transmission can be constructed in a particularly compact manner particularly accommodated to modern vehicle construction.

In the composite transmission of the present invention, in each of the four speed ranges of the hydrostatic unit, the latter can be shifted between a fully negative and a fully positive setting while nevertheless in each range the power branching is effective through the hydrostatic aggregate on the one hand and the mechanical power train on the other hand. This contributes especially to the advantages listed above at (c)-(k). For the reverse drive, depending upon the vehicle requirements, either a reversing transmission of conventional design can be provided for use during both forward and reverse speeds or a low-speed reverse can be provided in the first drive range by the use of a three shaft planetary transmission or a gear transmission with fixed speed sets using two clutches or brakes.

With the transmission according to the invention, the input power is branched to a hydraulic branch and a mechanical branch in all speed ranges whereby the hydraulic power is delivered to the summing transmission via the hydrostatic transmission and at least one clutch effective for each of the driving ranges. The mechanical power, by contrast, is delivered directly to the summing transmission.

Because one of the hydrostatic units can be shifted within each drive range between fully negative and positive positions, an optimum increase in the transmission coefficient, i.e. the product of the maximum output torque and maximum output speed or the product of the maximum starting traction force and the maximum speed of the vehicle is possible. Jolt-free shifting is insured since the hydraulic transmission can be set to effect a practically continuous efficiency transition at speed change.

In all operating conditions, the clutch members are driven synchronously with the load transfer being effected in the summing transmission with the hydraulic power at each upshift becoming negative so that the hydrostatic unit operates with its nominal output.

An important feature of the present invention, alluded to earlier, is that at startup of the vehicle, the hydrostatic unit is already in location so that the break-loose moment or torque has no detrimental effect. The advantage is especially marked when it is realized that tests have shown that the break-loose torque of a hydrostatic unit can result in tractive-force losses in a vehicle of about 15% if the initial acceleration of the vehicle is to depend upon start up of a hydrostatic transmission.

At the end of the first speed range, it is possible, with synchronism of all members of the summing transmission, to close both speed selection clutches and thereby cut out the hydrostatic transmission in the manner previously mentioned. This provides a direct power transfer, without branching, from the input shaft to the output shaft which takes place only along a mechanical power transfer train. This is especially advantageous for vehicles in industrial and agricultural use.

For automotive vehicles whose preferred operating speed is at the higher speed ranges of the transmission, we can provide, in accordance with another feature of the invention, a drive shaft which is concentric to or offset from the input and output shaft and which can be connected by respective clutches and/or gearing with the latter so that a direct drive is provided outside the hydraulic path. This mechanical transmission mode is preferably automatically switched into play.

For vehicles which are to operate with low reverse speeds, the composite transmission can be provided without a special direction-changing transmission. In this case, the reverse speed takes effect in the first speed range and to ensure the absence of a break-loose torque, the neutral setting of the transmission can have a setting of the hydrostatic unit which is between the maximum negative position and the neutral of the hydrostatic unit. Advantageously, this setting corresponds to 0.6 of the maximum negative speed of the constant displacement hydrostatic unit. This, of course, corresponds to a fluid displacement (per revolution) of −0.6 between the variable-displacement unit and the constant unit. The summing transmission is correspondingly adjusted and dimensioned so that the output shaft at this operating point of the composite transmission is at standstill. The reverse speed takes place between this point and maximum negative positioning of the variable displacement unit while the full positive displacement range of the variable-displacement hydrostatic unit is available for startup drive of the vehicle.

In other words, the maximum reverse speed is at the extreme negative position of the adjustable unit (−1). Thus there is available for reversed speed in the negative region, about 0.4 of the maximum speed which the hydrostatic transmission is capable of delivering. This corresponds to a reverse speed of 0.25 times the maximum forward speed in the first speed range of the vehicle. For forward speed, however, the maximum shifting of the transmission will amount to 1.6 times the maximum speed of the constant displcement until in the first speed range. The span of control available from the hydrostatic transmission in the first speed range is thus between its −0.6 and +1 position in a stepless manner.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
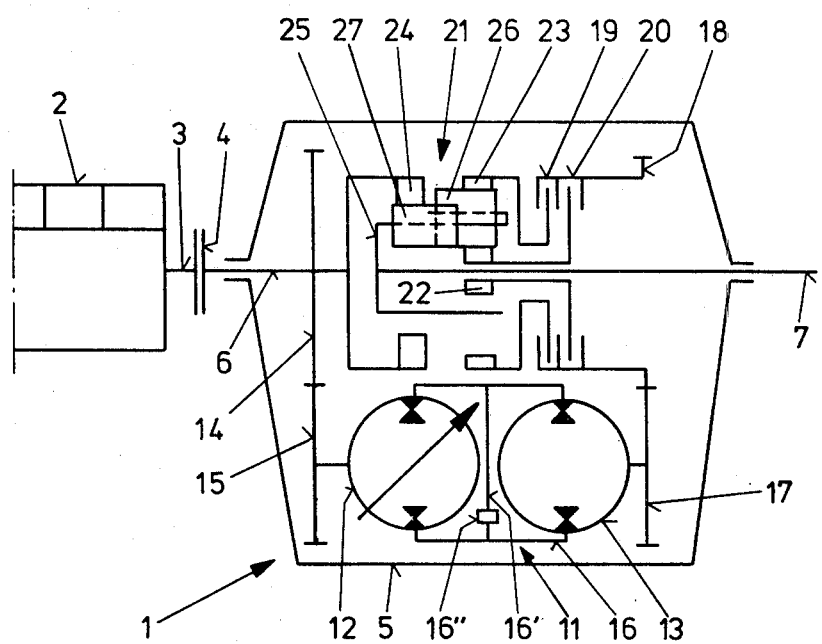
FIG. 1 is a diagram illustrating a hydrostatic transmission in combination with a mechanical transmission summing system in accordance with the principles of the present invention.

FIG. 1 shows a composite transmission 1 whose input shaft 6 is connected by a clutch or coupling 4 to the crankshaft 3 of an internal-combustion engine 2 of a vehicle. The coupling 4 can be a torque converter, a simple clutch or any other coupling effecting rotation of the input shaft of the transmission.

The composite transmission 1 comprises a housing 5 containing a hydrostatic transmission generally represented at 11 and a four-shaft planetary-gear arrangement forming a summing transmission 21. The power delivered by the shaft 6 is thus branched into hydraulic and mechanical power trains respectively.

The hydraulic power train comprises the hydrostatic transmission 11 and the latter, in turn, comprises a first hydrostatic unit 12 which is of the variable displacement type and a second hydrostatic unit 13 which is of the constant displacement type. Both of these hydrostatic units can be axial piston pumps or motors of conventional design, the two ports of these hydrostatic machines being connected by respective hydraulic lines forming the hydraulic circuit 16. The hydraulic unit 12 operates primarily as a pump when it is driven by gear 14 which meshes with the gear 15 carried by the shaft 6. The hydrostatic transmission 11 is connected to the summing transmission as will be apparent hereinafter.

The gears 14 and 15 thus connect the variable displacement unit 12, which is connected by the closed circuit 16 with the constant displacement unit 13, with the shaft 6 continuously.

The power of the hydrostatic transmission is selectively applied via the clutches 19 and 20 which are connected via gears 17 and 18 with the constant displacement unit 13. The clutches 18 and 19 are effective to deliver power either to the sun gear 22 or the ring gear 23 of the summing transmission 21.

The mechanical power train can be effected directly or via intermediate sets of gearing, to the summing transmission 21. In the embodiment illustrated, the shaft 6 is connected directly with a ring gear 24 (via a first shaft of the summing transmission) which meshes with the planetary wheels 27 of a planetary-gear carrier 25 (via a fourth shaft of the summing transmission). The planetary-gear carrier 25 is, in turn, connected with the output shaft 7 of the transmission. The sun gear 22 previously mentioned and the ring gear 23 also mesh with planetary gears 26 connected to the planet carrier 25.

The hydraulic power is delivered by closing one of the range-selection clutches 19 or 20 via the ring gear 23 (second shaft of a summing transmission) in the first speed range I or the sun gear 22 (third shaft of a summing transmission) in the second speed range II to the summing transmission 21 in which the power delivered by the hydraulic transmission is combined with the mechanically delivered power and delivered via the planet carrier 25 to the output shaft 7.

In the neutral setting of the transmission shown in FIG. 1, the hydrostatic transmission 11 is set to a predetermined negative setting, e.g. about −0.6 of its full range of −1 to +1. As a result, the second hydrostatic unit 13 which has a constant displacement, is given a corresponding negative rotation between its maximum negative value and its 0 or standstill value. To ensure a standstill of the output shaft 7, a shunt path 16' is provided in the hydraulic circulation 16 and is provided with a shunt valve 16" which can bring gear 17 to standstill. Alternatively, both of the range clutches 19 and 20 can be opened. This allows the unit 13 to continue in rotation without delivering any rotation to the summing transmission.

For speed control in the first speed range, the hydrostatic transmission 11 can be varied, i.e. by varying the displacement of the unit 12, up to the maximum positive position. In this setting, all of the members of the summing transmission 21 are driven synchronously. Speed change can then be effected by closing the second clutch 20 and opening the first clutch 19. The setting of the transmission 11 back to 0 and again to its maximum negative value shifts the vehicle to its maximum speed with maximum engine speed. In the reverse range, the hydrostatic transmission 11 is adjusted from its intermediate negative position to its maximum negative position corresponding to maximum negative speed or reverse of the vehicle.

Figure 2:
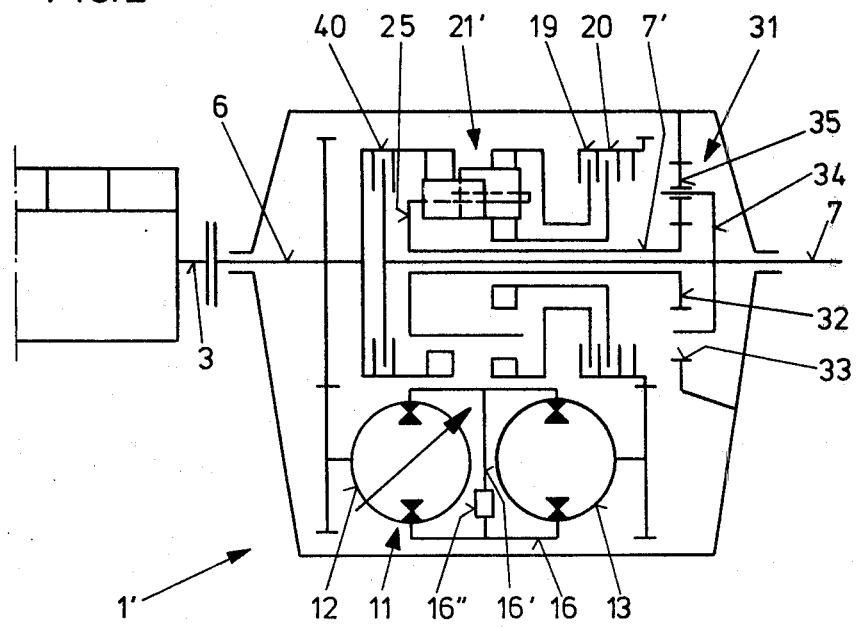
FIG. 2 is a modification of the system of FIG. 1 in which a three-shaft planetary transmission is provided in addition to elements of FIG. 1.

The composite transmission 1' shown in FIG. 2 differs from that of FIG. 1 in that a ratio stepping transmission 31 is provided between the output shaft 7 and the summing transmission 21' which in principle is constructed in the manner previously described. The output element of transmission 31, namely, the planet carrier 34 whose planet gears 35 orbit the shaft 7, as well as the output shaft 7, are connected to a clutch 40 by means of which a direct connection between the input shaft 6 and the output shaft 7 can be effected. The ring gear 33 of transmission 31 is fixed to the housing while the sun gear 32 of this transmission is connected to the planet carrier (output element) of the summing transmission 21 via a hollow shaft 7'. In the upper limiting speed of the transmission, the shaft 7 runs synchronously with the input shaft 6 so that closure of clutch 40 and the opening of clutches 19 and 20 for the shunting of the transmission 11 will allow direct power transfer. Otherwise the system of FIG. 2 provides an operation similar to that of FIG. 1 except for the contribution of a speed change via the transmission 31.

Figure 3:
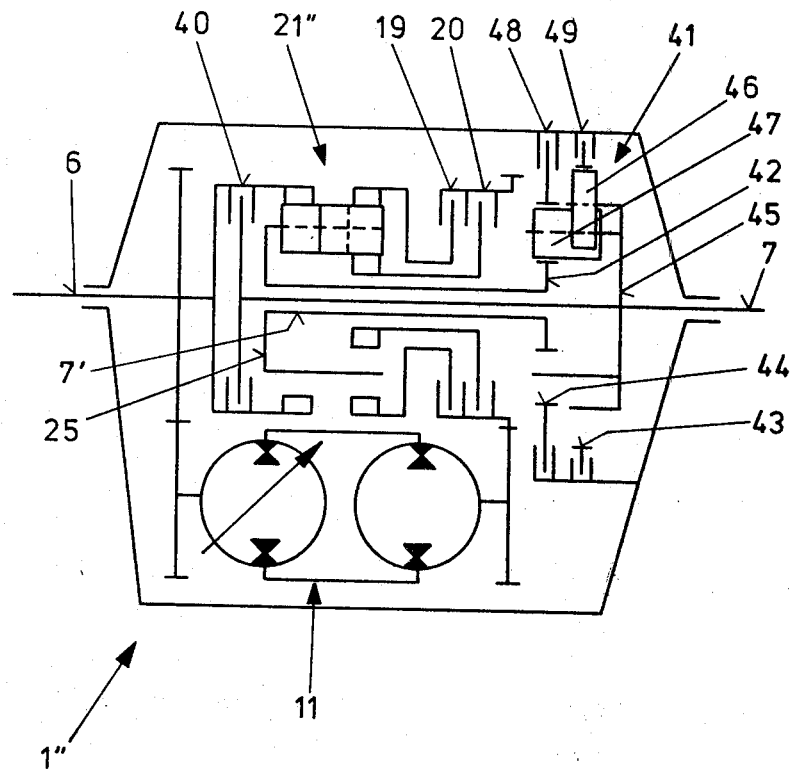
FIG. 3 shows the system of FIG. 1 provided with an additional four-shaft planetary-gear transmission for direction change and a device for direct power transmission from the input to the output shafts.

The composite transmission 1" shown in FIG. 3 differs from that of FIG. 2 in that in the neutral position of the composite transmission, the hydrostatic unit 11 is set to its maximum negative limiting value rather than an intermediate value and for the reverse operation of the shaft 7, an additional direction-change transmission is provided. This additional transmission can be a four-shaft planetary transmission 41 connected between the summing transmission 21″ and the output shaft 7. This direction changing transmission can comprise two brakeable members, e.g. ring gears 43 and 44 which are provided with respective brakes 48 and 49. The planetary gears 46 and 47 meshing with these ring gears 43 and 44 are mounted on a common carrier 45 whose sun gear 42 is connected to the hollow shaft 7′ previously mentioned. During forward drive, the power is effected by the closure of the clutch or brake 48 and with the ring gear 44 braked. Thus the power transmission is via the sun gear 42, the planetary gear 47 and the planetary carrier 45 to the output shaft 7. For reverse drive, clutch or brake 49 is closed and the power is effected via the sun gear 42, the planetary gear 46 and the planet carrier 45 to the output shaft 7. The direction change is thus effected by the second planetary gear 46, which meshes with gear 47 and then with the sun gear 42. As in the embodiment of FIG. 2 direct power transfer from the input to the output shaft can be effected via the clutch 40.

We claim:

1. A steplessly adjustable hydrostatic-mechanical composite transmission comprising:
   an input shaft connectible to a prime mover and an output shaft connectible to a load;
   a hydrostatic transmission comprising two hydraulic machine units connected in a closed hydraulic circuit and having respective shafts, a first of said units being of variable displacement type shiftable from an extreme negative setting to an extreme positive setting through a zero displacement setting;
   a four-shaft planetary summing transmission having a first shaft, second shaft, a third shaft, a fourth shaft and planetary gearing interconnecting said first, second, third and fourth shafts for correlated operation, said first, second, third and fourth shafts being coaxial;
   means connecting said input shaft to a first shaft of said summing transmission;
   means connecting said input shaft to the shaft of one of said units;
   respective clutches coaxial with said first, second, third and fourth shafts, connecting the shaft of the other of said units to second and third shafts of said summing transmission, respectively, and being selectively individually and collectively actuatable, said clutches on joint actuation causing the planetary gearing of said summing transmission to rotate as a unit; and
   means including a selectively actuatable reversing transmission for connecting said fourth shaft of said summing transmission with said output shaft.

2. The composite transmission defined in claim 1 which has the following setting in a first speed range:
   (a) in the maximum negative end setting of the composite transmission corresponding to maximum possible negative setting corresponding to maximum reverse output shaft speed, the variable displacement unit is at its maximum negative setting; and
   (b) in the neutral setting of the composite transmission, the setting of the variable displacement unit is between the zero displacement setting and the maximum negative displacement setting thereof.

3. The composite transmission defined in claim 2 wherein the setting between the zero setting and the maximum negative setting is about 0.6 of the maximum negative setting.

4. The composite transmission defined in claim 1 wherein said reversing transmission is a planetary-gear transmission.

5. The composite transmission defined in claim 4 wherein the reversing transmission is a transmission having fixed ratio gear sets selectively rendered effective by a clutch or brake.

6. The composite transmission defined in claim 1 wherein said first shaft of said summing transmission is connected to a first ring gear, said second and third shafts of said summing transmission are respectively connected to a second ring gear and a sun gear and said fourth shaft of said summing transmission is connected to a planetary carrier, said planetary carrier being provided with planet gears meshing with said ring gear and with said sun gear.

7. The composite transmission defined in claim 6 wherein said first unit is said one of said units, said other of said units being a constant-displacement hydraulic machine.

8. A steplessly adjustable hydrostatic-mechanical composite transmission comprising:
   an input shaft connectible to a prime mover and an output shaft connectible to a load;
   a hydrostatic transmission comprising two hydraulic machine units connected to a closed hydraulic circuit and having respective shafts, a first of said units being of variable displacement type shiftable from an extreme negative setting to an extreme positive setting through a zero displacement setting;
   a four-shaft planetary summing transmission having a first shaft, a second shaft, a third shaft, a fourth shaft and planetary gearing interconnecting said first, second, third and fourth shafts for correlated operation;
   means connecting said input shaft to a first shaft of said summing transmission;
   means connecting said input shaft to the shaft of one of said units;
   respective clutches connecting the shaft of the other said units to second and third shafts of said summing transmission, respectively, and being selectively individually and collectively actuatable;
   means for connecting said fourth shaft of said summing transmission with said output shaft, the means connecting the fourth shaft of said summing transmission to the output shaft being a reversing transmission; and
   a further clutch operatively connecting the input shaft to the output shaft and forming a power bypass for said summing transmission and said hydrostatic transmission.

9. A steplessly adjustable hydrostatic-mechanical composite transmission comprising:
   an input shaft connectible to a prime mover and output shaft connectible to a load;
   a hydrostatic transmission comprising two hydraulic machine units connected to a closed hydraulic circuit and having respective shafts, a first of said units being of variable displacement type shiftable from an extreme negative setting to an extreme positive setting through a zero displacement setting;

a four-shaft planetary summing transmission having a first shaft, a second shaft, a third shaft, a fourth shaft and planetary gearing interconnecting said first, second, third and fourth shafts for correlated operation;

means connecting said input shaft to a first shaft of said summing transmission;

means connecting said input shaft to the shaft of one of said units;

respective clutches connecting the shaft of the other of said units to second and hird shafts of said summing transmission, respectively and being selectively individually and collectively actuatable;

means for connecting said fourth shaft of said summing transmission with said output shaft, the means connecting the fourth shaft of said summing transmission to the output shaft being a reversing transmission; and a shunt valve connected across said hydraulic circuit and effective in the neutral setting of the composite transmission and upon direct coupling of the input and output shafts together.

10. A steplessly adjustable hydrostatic-mechanical composite transmission comprising:

an input shaft connectible to a prime mover and an output shaft connectible to a load;

a hydrostatic transmission comprising two hydraulic machine units connected to a closed hydraulic circuit and having respective shafts, a first of said units being of variable displacement type shiftable from an extreme negative setting to an extreme positive setting through a zero displacement setting;

a four-shaft planetary summing transmission having a first shaft, a second shaft, a third shaft, a fourth shaft and planetary gearing interconnecting said first, second, third and fourth shafts for correlated operation;

means connecting said input shaft to a first shaft of said summing transmission;

means connecting said input shaft to the shaft of one of said units;

respective clutches connecting the shaft of the other of said units to second and third shafts of said summing transmission, respectively and being selectively individually and collectively actuatable;

means for connecting said fourth shaft of said summing transmission with said output shaft, said first shaft of said summing transmission being connected to a first ring gear, said second and third shafts of said summing transmission being respectively connected to a second ring gear and a sun gear and said fourth shaft of said summing transmission being connected to a planetary carrier, said planetary carrier being provided with planet gears meshing with said ring gear and with said sun gear, said first unit being said one of said units, said other of said units being a constant-displacement hydraulic machine; and a clutch between said input shaft and said output shaft for the direct connection thereof together.

11. The composite transmission defined in claim 10, further comprising a further planetary gear transmission between said fourth shaft and said output shaft.

12. The composite transmission defined in claim 11 wherein said further planetary gear transmission includes a planet carrier connected to said output shaft, a sun gear connected to said fourth shaft, a fixed ring gear, and planet gears on the planet carrier of the further transmission meshing with the ring and sun gears thereof.

13. The composite transmission defined in claim 11 wherein said further transmission comprises a pair of ring gears which can be selectively braked, respective planet gears meshing with said ring gears and with each other on a common planet carrier connected to said output shaft, and a sun gear meshing with one of the latter planet gears and connected to said fourth shaft.

14. The composite transmission defined in claim 11 wherein said summing transmission, said hydrostatic transmission and said further transmission are received in a common housing.

* * * * *